(12) United States Patent
Yokosh et al.

(10) Patent No.: US 7,455,313 B2
(45) Date of Patent: Nov. 25, 2008

(54) TRAILER HITCH RECEIVER COVER

(76) Inventors: Steven M. Yokosh, N62 W34153 Bayview Rd., Oconomowoc, WI (US) 53066; Bryon P. Martin, W227 S8975 Marianne Ave., Big Bend, WI (US) 53103

(*) Notice: Subject to any disclaimer, the term of this patent is extended or adjusted under 35 U.S.C. 154(b) by 49 days.

(21) Appl. No.: 11/683,032

(22) Filed: Mar. 7, 2007

(65) Prior Publication Data
US 2007/0222186 A1 Sep. 27, 2007

Related U.S. Application Data

(60) Provisional application No. 60/779,726, filed on Mar. 7, 2006.

(51) Int. Cl.
*B60D 1/60* (2006.01)
(52) U.S. Cl. ....................... 280/507; 150/166
(58) Field of Classification Search ................. 280/507; 150/166; 293/142
See application file for complete search history.

(56) References Cited

U.S. PATENT DOCUMENTS

| D424,485 | S | 5/2000 | Parker |
| D425,460 | S | 5/2000 | Peroni |
| D426,798 | S | 6/2000 | Peroni |
| 6,199,892 | B1 * | 3/2001 | Dahl .......................... 280/507 |
| 6,463,686 | B1 * | 10/2002 | Eisenbraun .................. 40/591 |
| 6,945,551 | B2 * | 9/2005 | Blake ......................... 280/507 |
| 6,971,663 | B1 * | 12/2005 | Blake ......................... 280/507 |
| 7,125,035 | B1 * | 10/2006 | Huenefeld .................. 280/507 |

* cited by examiner

*Primary Examiner*—Paul N Dickson
*Assistant Examiner*—Marc A Scharich
(74) *Attorney, Agent, or Firm*—Joseph S. Heino; Patrick M. Bergin

(57) ABSTRACT

The trailer hitch receiver cover of the present invention has a resilient means for covering and sealing the peripheral collar or flange of the hitch receiver. It also has integrally-formed means for covering and sealing the lateral holes in the hitch receiver. In alternative embodiments, the lateral hole sealing means is accomplished by structure that is disposed either internally to the trailer hitch receiver or externally to it.

10 Claims, 6 Drawing Sheets

TRAILER HITCH RECEIVER COVER

This application claims the priority and benefit of U.S. Provisional Patent Application Ser. No. 60/779,726 filed Mar. 7, 2006.

FIELD OF THE INVENTION

This invention relates generally to motor vehicles, trailer hitches and trailer hitch receivers. More particularly, it relates to covers for use with trailer hitch receivers of current manufacture.

BACKGROUND OF THE INVENTION

Motor vehicles are frequently outfitted with means for towing trailers and the like. This towing means most usually takes the form of a hollow tubular receiver that is mounted at the rear of the towing vehicle. This hollow tubular receiver typically comprises a hollow metal tube having a square cross section and also having a peripheral collar or flange at the rear-most portion of the hollow tube. The tube is dimensioned so as to receive a portion of a mounting hitch having a spherical ball disposed at one end. The opposite end of the mounting hitch is typically another square member that mates with the tube of the trailer hitch receiver and is slidably insertable into and out of it. The outer dimension of the inserted end of the mounting hitch and the inner dimension of the receiver tube are similar such that a close tolerance between those two components is achieved. This arrangement ensures that there is minimal vibration and movement between those two components. To secure the mounting hitch within the receiver tube, however, the user must insert a locking pin or bolt through linearly aligned holes formed both in the receiver tube and in the inserted end of the mounting hitch.

When the mounting hitch is removed from the trailer hitch receiver, the unused opening at the end of the trailer hitch receiver is exposed to the elements. Those elements include water, dirt and salt, all of which can result in a deposit of dirt and debris collecting within the hitch receiver as well as corrosion and rusting of the inside surface of the hitch receiver. Such debris accumulation, rust and corrosion can impede, or even completely prevent, the later insertion of the mounting hitch within the hitch receiver.

To prevent the inside of the hitch receiver from being exposed to the elements, certain plugs have been introduced into the motor vehicle marketplace. The intended purpose of many such plugs, however, is to simply cover up the unattractive opening to the hitch receiver with some sort of novelty plug. Accordingly, such plugs are designed to do little more than incorporate a face piece that simply butts up against the face of the peripheral collar of the trailer hitch receiver. This presents a less than perfect cover for the trailer hitch receiver opening against the elements and does absolutely nothing to cover up the lateral holes in the hitch receiver, which holes also serve as secondary entry ways for water, dirt and salt to get into the hitch receiver.

In the view of these inventors, there is a need to provide a trailer hitch receiver cover that effectively wraps around and sealingly engages the primary opening at the peripheral collar or flange of the hitch receiver so as to prevent the exposure of the hitch receiver interior to the elements. What is also needed is such a hitch receiver cover that also incorporates means for sealing the lateral holes in the hitch receiver as well as the primary opening to the hitch receiver interior. What is also needed is such a cover that integrates both features in a single unitary device. What is also needed is such a cover that is fabricated of a resilient and flexible material.

SUMMARY OF THE INVENTION

It is, therefore, a principal object of this invention to provide a new and useful trailer hitch receiver cover that effectively wraps around the peripheral collar or flange of the hitch receiver to prevent the exposure of the hitch receiver interior to the elements; that also incorporates means for sealing the lateral holes in the hitch receiver; that incorporates both features in a single unitary device; and that allows the device to be made of a resilient and flexible material.

The trailer hitch receiver cover of the present invention has obtained these objects. It provides for a trailer hitch receiver cover that has a resilient means for covering and sealing the peripheral collar or flange of the hitch receiver. It also provides for integrally-formed means for covering and sealing the lateral holes in the hitch receiver. In alternative embodiments, the lateral hole sealing means is accomplish by structure that is disposed either internally to the trailer hitch receiver or externally to it.

The foregoing and other features of the trailer hitch receiver cover of the present invention will be apparent from the detailed description that follows.

DETAILED DESCRIPTION OF THE PREFERRED EMBODIMENT

Figure 1:
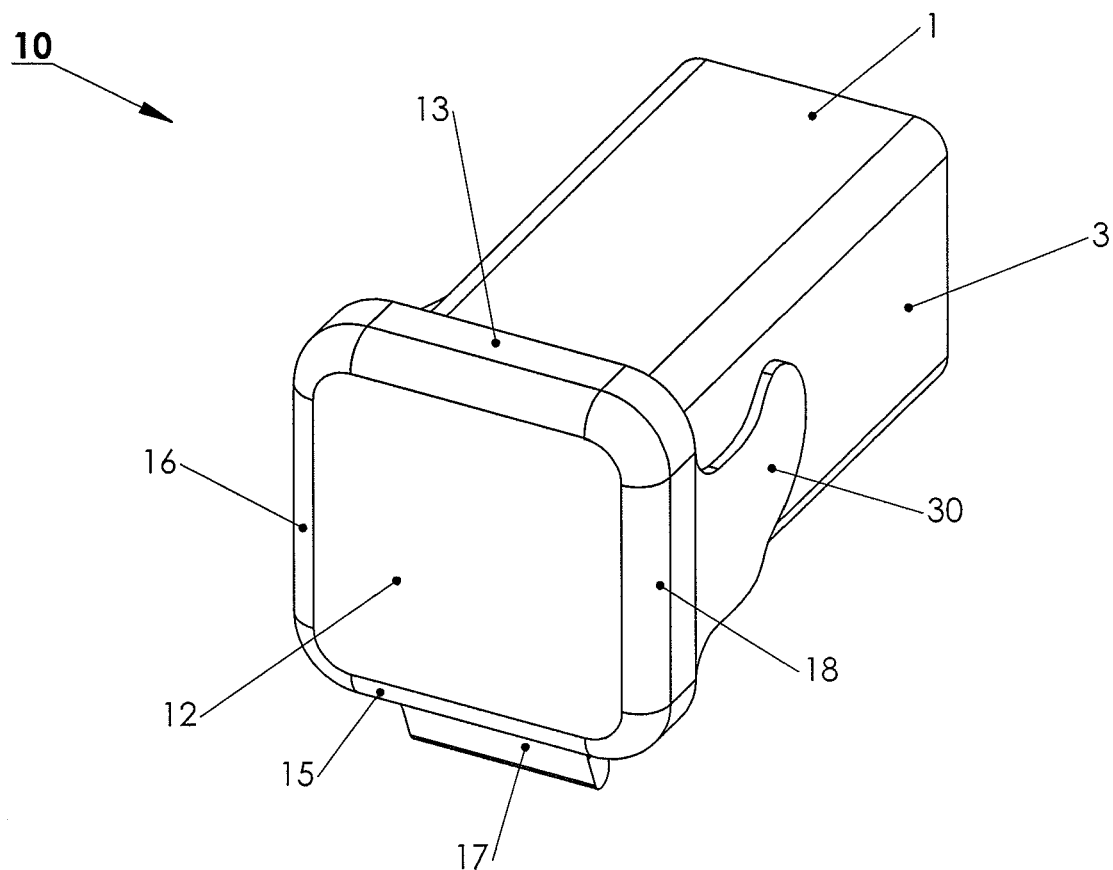
FIG. 1 is a front, top and right side perspective view of a first preferred embodiment of the trailer hitch receiver cover constructed in accordance with the present invention.

Referring now to the drawings in detail, wherein like numerals represent like structure and elements throughout, FIG. 1 illustrates a first preferred embodiment of the trailer hitch receiver cover, generally identified 10, that is constructed in accordance with the present invention. The cover 10 comprises a unitary structure having a front face 12. Extending rearwardly of the front face 12 is a top wrap-around edge 13 and a bottom wrap-around edge 15, as well as a first side edge 16 and a second side edge 18. All of the edges 13, 15, 16, 18 are integrally formed with the front face 12.

Figure 2:
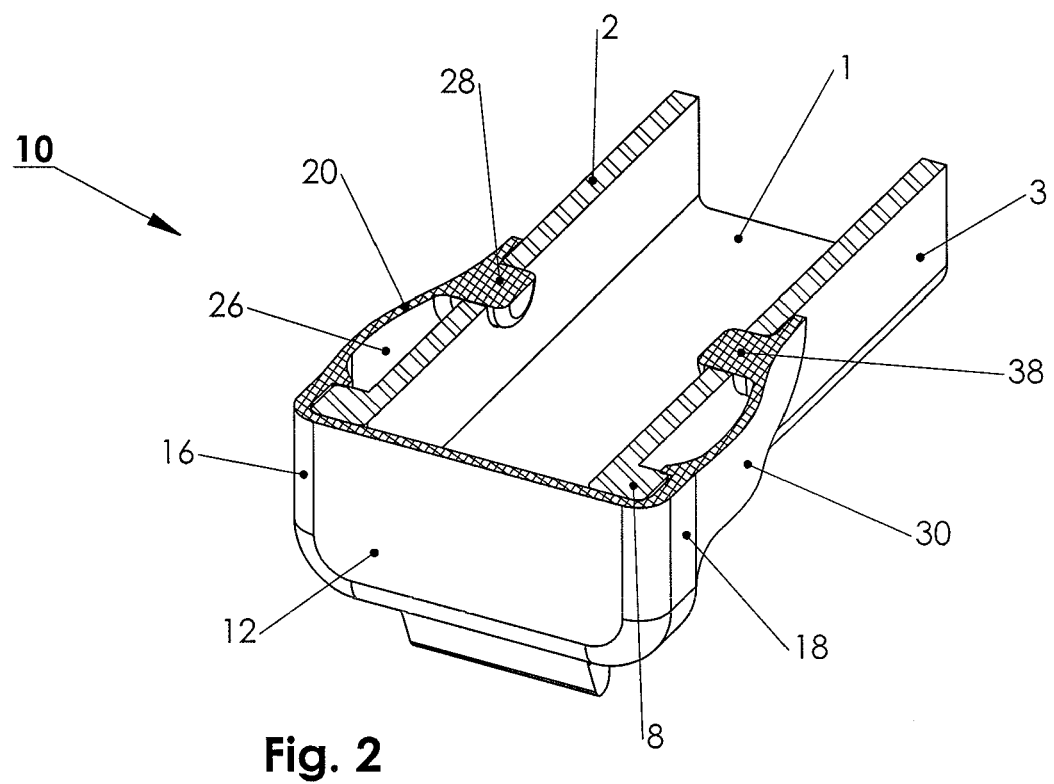
FIG. 2 is a cross-sectioned front, top and right side perspective view of the cover illustrated in FIG. 1

The cover 10 is intended to be placed over the end of a trailer hitch receiver tube 1. See FIGS. 2 through 4. The receiver tube 1 is a typical square-shaped elongate metal tube having a square cross-section and further having a first side wall 2 and a second side wall 3. The first side wall 2 includes a first side wall aperture 4 and the second side wall 3 includes a second side wall aperture 5. The apertures 4 and 5 are linearly aligned. Forwardly of the receiver hitch tube 1, and at its distal-most portion relative to the vehicle (not shown) that it is attached to, is a peripheral collar or flange 8. At the first side wall 2, the flange 8 includes a rearwardly-facing first flange surface 6. At the second side wall 3, the flange 8 includes a similar rearwardly-facing second flange surface 7. Although identified as separate structures for purposes of explanation only, it is to be understood that the rearwardly-directed surfaces 6, 7 of the flange 8 are actually part of the same structure, the flange 8 completely encircling the receiver 1.

It is to be understood that the lips 24, 34 discussed above form portions of a continuous lip structure that completely encircles and captures the peripheral collar or flange 8 of the receiver tube 1. It is also to be understood that the inner capture cavity 14 is also a structure that completely encircles and captures the peripheral collar or flange 8 of the receiver tube 1.

In this first preferred embodiment, a pair of rearwardly-directed side extension members 20, 30 extend rearwardly from the front face 12 of the cover 10. More specifically, the extension members 20, 30 extend rearwardly from the first side edge 16 and the second side edge 18, respectively, of the front face 12. The first extension member 20 includes an inner surface 26. Extending perpendicularly inward from the inner surface 26 is a lip 24 and a tab 28, the tab 28 being disposed further rearwardly of the lip 24 relative to the front face 12. Similarly, the second extension member 30 includes an inner surface 36 having a lip 34 and a tab 38 extending perpendicularly inward from it. Forwardly of the lips 24, 34 is an inner capture cavity 14. This inner capture cavity 14 is defined at a portion by a first capture cavity recess 22 and by a second capture cavity recess 32 at the lip 24 of the first extension member 20 and at the lip 34 of the second extension member 30, respectively.

Figure 3:
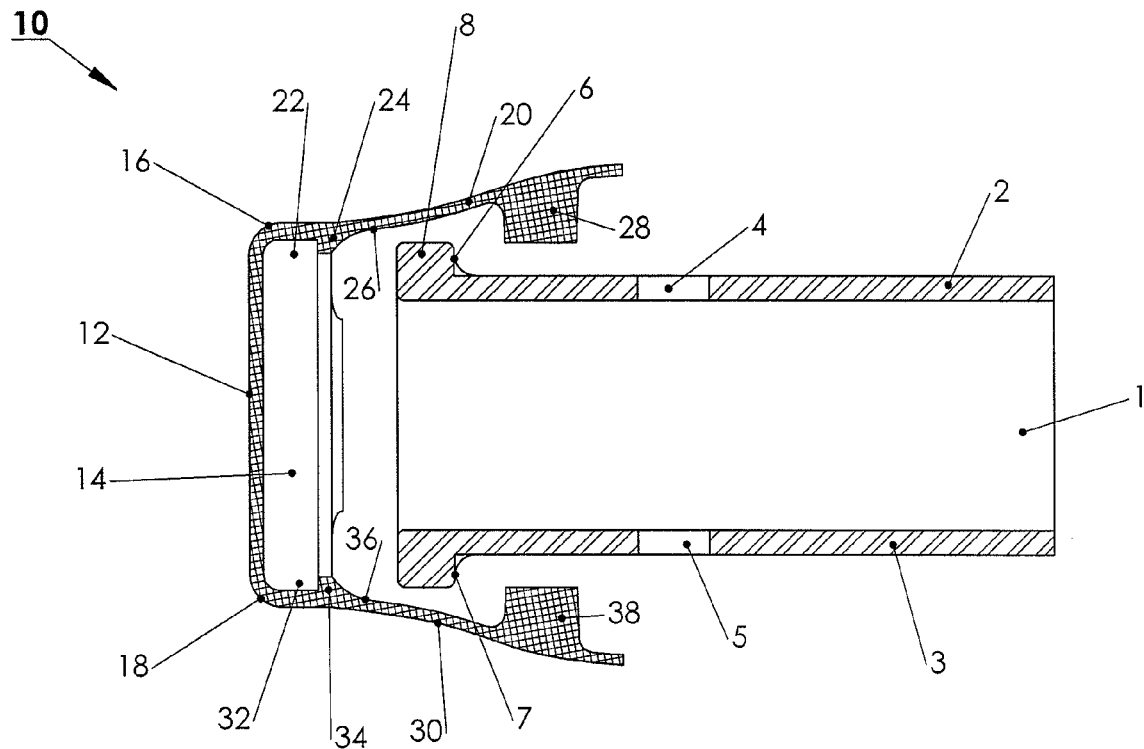
FIG. 3 is a cross-sectioned and top plan view of the cover illustrated in FIGS. 1 and 2 showing the cover prior to engagement with a trailer hitch receiver.

In application, as shown in FIG. 3, the cover 10 is urged towards the receiver 1 such that the tabs 28, 38 of the extension members 20, 30, respectively, pass over the collar or flange 8 of the receiver 1. As the inner capture cavity 14 and the lips 24, 34 are urged towards the flange 8, the cover 10 will have enough resiliency to allow the lips 24, 34 to pass over the flange 8 thereby allowing the capture cavity recess 22 of the first extension member 20 to engage the rearwardly-facing surface 6 of the receiver flange 8. Similarly, the capture cavity recess 32 of the second extension member 30 will engage the rearwardly-facing surface 7 of the receiver flange 8, thereby fully engaging the cover 10 with the collar or flange 8 and preventing any debris, water or other foreign matter from entering the receiver tube 1 at that end.

Figure 4:
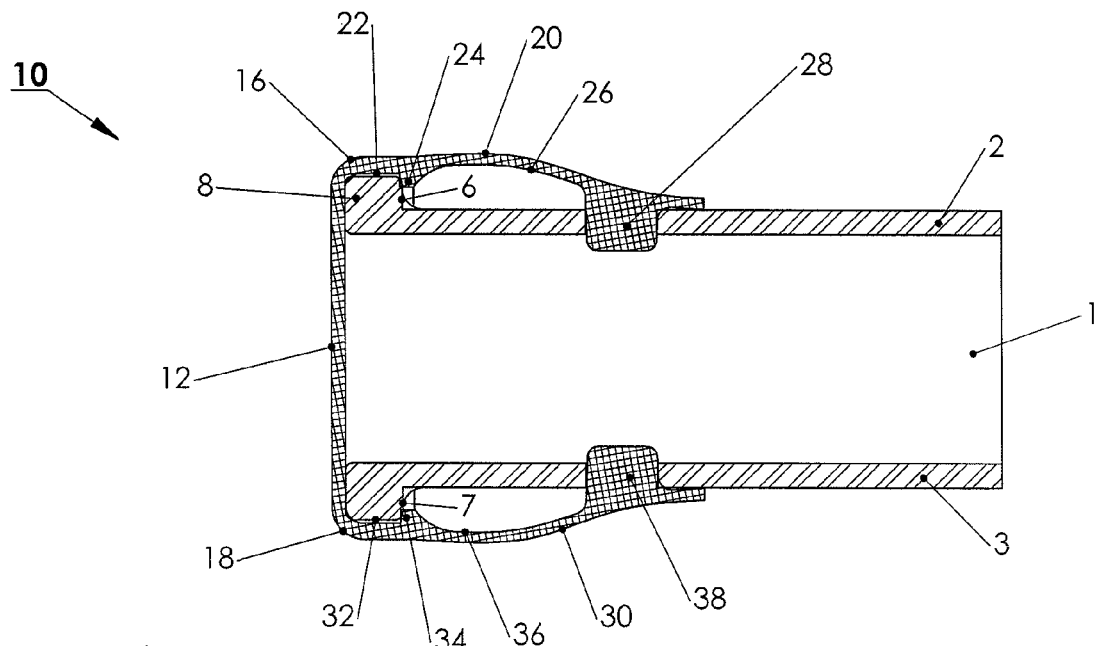
FIG. 4 is a view similar to that illustrated in FIG. 3 but showing the cover fully engaged with the trailer hitch receiver.

With the capture cavity 14 fully engaged with the collar or flange 8, the tab 28 of the first side extension member 20 is a position that it can be urged into the first side wall aperture 4. At the same time, the tab 38 of the second side extension member 30 is in a position that it can be urged into the second side wall aperture 5, thereby preventing the entry of debris, water and other foreign matter into the receiver tube 1 at those apertures 4, 5 as well. This functionality allows the interior of the receiver tube 1 from becoming contaminated by dirt and corrosive agents, thus preserving the integrity of the inside surfaces of the tube 1 under all adverse conditions. The fully engaged cover 10 is illustrated in FIG. 4. To remove the cover 10 from the receiver tube 1, the reverse of the steps identified above are performed by the user.

It is the intention of these inventors, and it is also to be understood by one skilled in the art, that the cover 10 of the first preferred embodiment be constructed of a single piece of material, preferably a resilient and weather-resistant rubber or other flexible material. Furthermore, the cover may be made of other materials and may be fabricated in virtually any color that is available for molding of such products.

It should also be noted that the first preferred embodiment of the cover 10 includes a pull tab 17 disposed immediately below the bottom edge 15 of the front face 12. The pull tab 17 may be used to aid in removal of the cover 10. It may also be used to house the face of an electrical plug (not shown) that normally extends from the rear of the towing vehicle (also not shown) to prevent its contamination and exposure to the elements when the trailer is disconnected from the towing vehicle. While this is an added feature of the preferred embodiment of the present invention, such is not a limitation of the invention.

Figure 5:
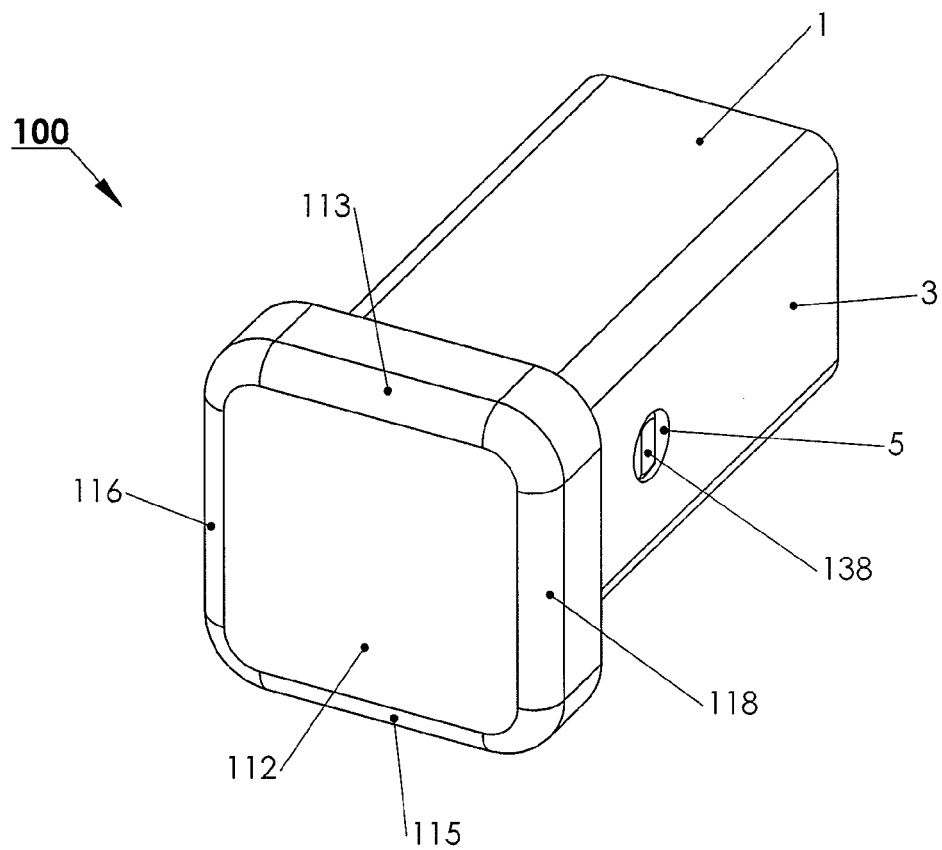
FIG. 5 is the second preferred embodiment of the trailer hitch receiver cover constructed in accordance with the present invention.

Referring now to FIG. 5, it illustrates a second preferred embodiment of the trailer hitch receiver cover, generally identified 100, that is constructed in accordance with the present invention. The cover 100 similarly comprises a unitary structure having a front face 112. Extending inwardly of the front face 112 is a top wrap-around edge 113 and a bottom wrap-around edge 115, as well as a first side edge 116 and a second side edge 118.

Figure 6:
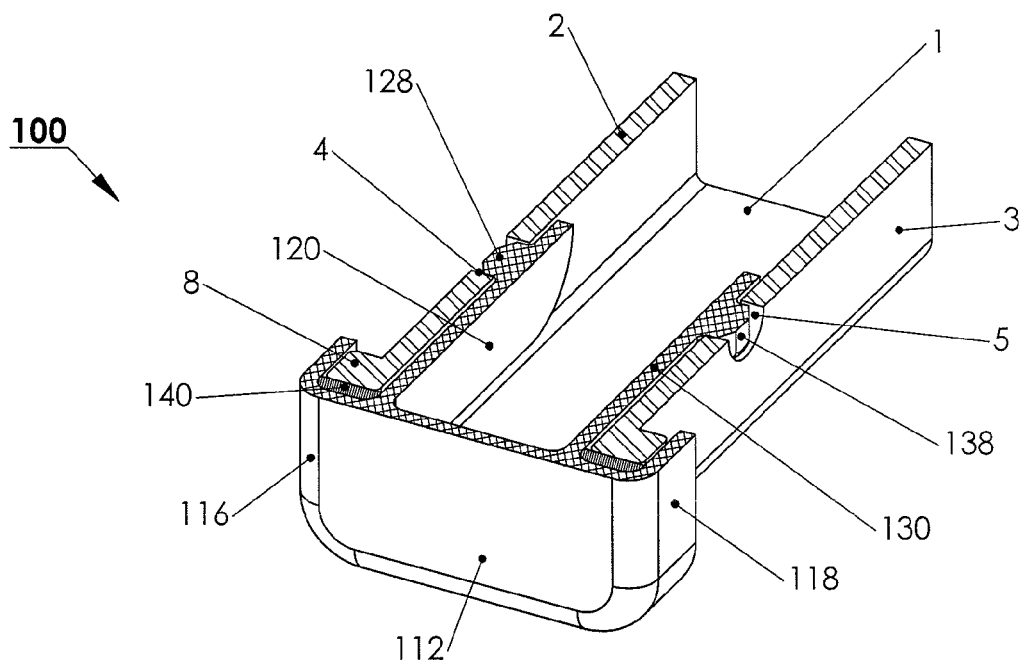
FIG. 6 is a cross-sectioned front, top and right side perspective view of the cover illustrated in FIG. 5

As with the first preferred embodiment, the cover 100 of the second embodiment is intended to be placed over the end of a trailer hitch receiver tube 1. See FIGS. 6 through 8. Again, the receiver tube 1 is a typical square-shaped elongate metal tube having a square cross-section and further having side walls 2, 3 and side wall apertures 4, 5, respectively, and a collar or flange 8, the flange 8 having a front face 9. In this second preferred embodiment, a pair of rearwardly-directed first and second extension members 120, 130 extend rearwardly from the front face 112 of the cover 100. As compared to the first embodiment, however, the extension members 120, 130 are disposed to the inside of the hitch receiver 1, the extension members 120, 130 being resiliently flexible toward and away from one another. The first extension member 120 includes an outer surface 126. Extending perpendicularly outward from the outer surface 126 is a tab 128. Similarly, the second extension member 130 includes an outer surface 136 having a tab 138 extending perpendicularly outward from it. Rearwardly of the front face 112 is an inner capture cavity 114. This capture cavity 114 is defined, in part, by the first side edge 116 and a proximal portion 122 of the first extension member 120 and by the second side edge 118 and a proximal portion 132 of the second extension member 130. It is to be noted that the same structure exists as to the top and bottom side edges 113, 115, respectively, as well.

Figure 7:
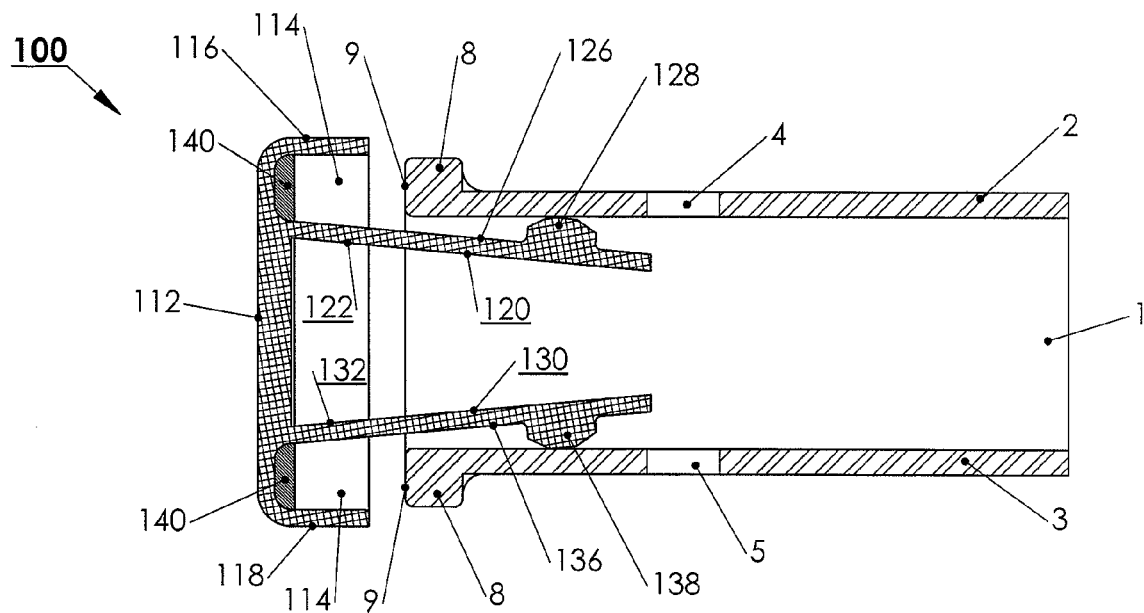
FIG. 7 is a cross-sectioned and top plan view of the cover illustrated in FIGS. 5 and 6 showing the cover prior to engagement with a trailer hitch receiver.
Figure 8:
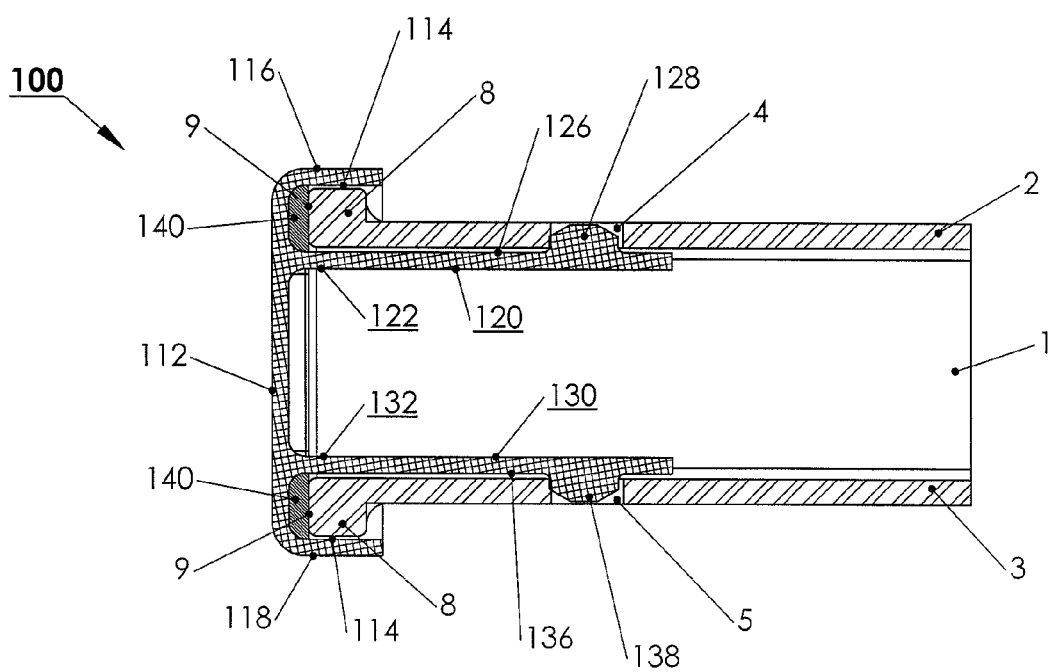
FIG. 8 is a view similar to that illustrated in FIG. 7 but showing the cover fully engaged with the trailer hitch receiver.

As shown in FIG. 7, the cover 100 is urged towards the receiver 1 such that the tabs 128, 138 of the extension members 120, 130, respectively, slide into the receiver 1. As the inner capture cavity 114 is urged towards the peripheral collar or flange 8, the cover 100 will have enough resiliency to envelop flange 8, thereby urging the front face 9 of the flange 8 to engage a resilient gasket 140 that is held in place adjacent the front face 112 of the cover 10. The gasket 140 prevents any debris, water or other foreign matter from entering the receiver tube 1 at that end. At the same time that the capture cavity 114 and gasket 140 become fully engaged with the flange 8, the tab 128 of the first extension member 120 is urged into the first side wall aperture 4 and the tab 138 of the second extension member 130 is urged into the second side wall aperture 5, thereby preventing the entry of debris, water and other foreign matter into the receiver tube 1 at those apertures 4, 5 as well. This functionality allows the receiver tube 1 from becoming contaminated by dirt and corrosive agents, thus preserving the integrity of the inside surfaces of the tube 1 under adverse conditions. The fully engaged cover 100 is illustrated in FIG. 8. To remove the cover 100 from the receiver tube 1, the reverse of the steps identified above are performed.

Figure 9:
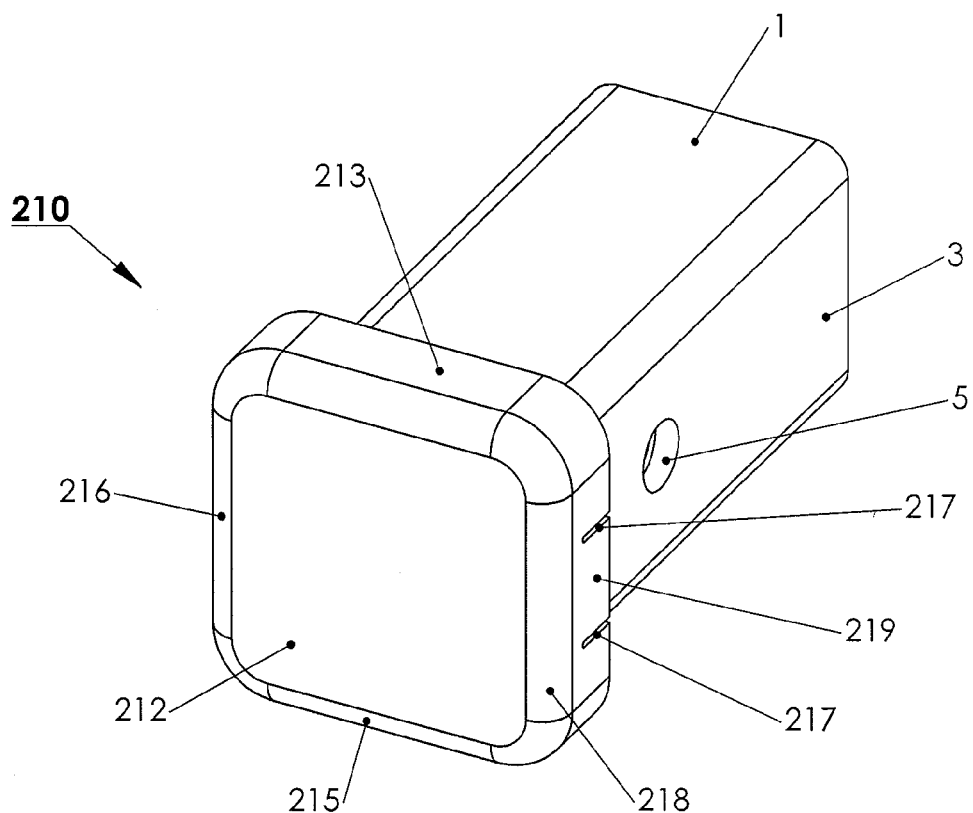
FIG. 9 is the third preferred embodiment of the trailer hitch receiver cover constructed in accordance with the present invention

Referring now to FIG. 9, it illustrates yet a third preferred embodiment of the trailer hitch receiver cover, generally identified 210, that is constructed in accordance with the present invention. The cover 210 comprises a unitary structure having a front face 212. Extending inwardly of the front face 212 is a top wrap-around edge 213 and a bottom wrap-around edge 215, as well as a first side edge 216 and a second side edge 218. In this third embodiment, note that the second side edge 218 is configured with a pair of slits 217 which define the edges of a side edge finger 219. Though not shown in FIG. 9, it is intended that this structure exists at the first side edge 216 of the cover 210 as well.

Figure 10:
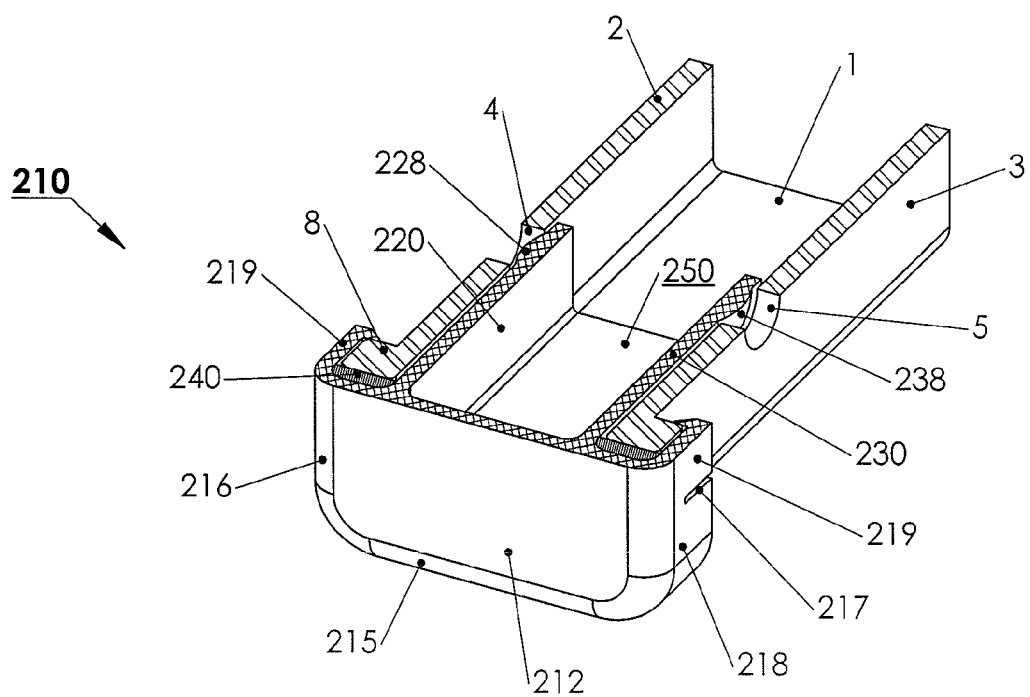
FIG. 10 is a cross-sectioned front, top and right side perspective view of the cover illustrated in FIG. 9.

As with the two other prior embodiments, the cover 210 is intended to be placed over the end of a trailer hitch receiver tube 1. See FIGS. 10 through 12. The receiver tube 1 is the same square-shaped elongate metal tube as previously described. In this third preferred embodiment, a single hollow extension member 250 protrudes rearwardly of the face 212 of the cover. The extension member 250 includes a pair of rearwardly-directed side walls 220, 230. The first side wall 220 includes an outer surface 226. Extending outwardly of the outer surface 226 is a tab 228. Similarly, the second side wall 230 includes an outer surface 236 having a tab 238 extending outwardly from it. An inner capture cavity 214 is defined between a proximal portion 222 of the first side wall 220 and the cover first side edge 216 and by a proximal portion 232 of the second side wall 230 and the cover second side edge 218. Additionally, the catch tab 219 includes a lip 211, the catch tab 219 and lip 211 structure existing to each side 216, 218 of the cover 210.

Figure 11:
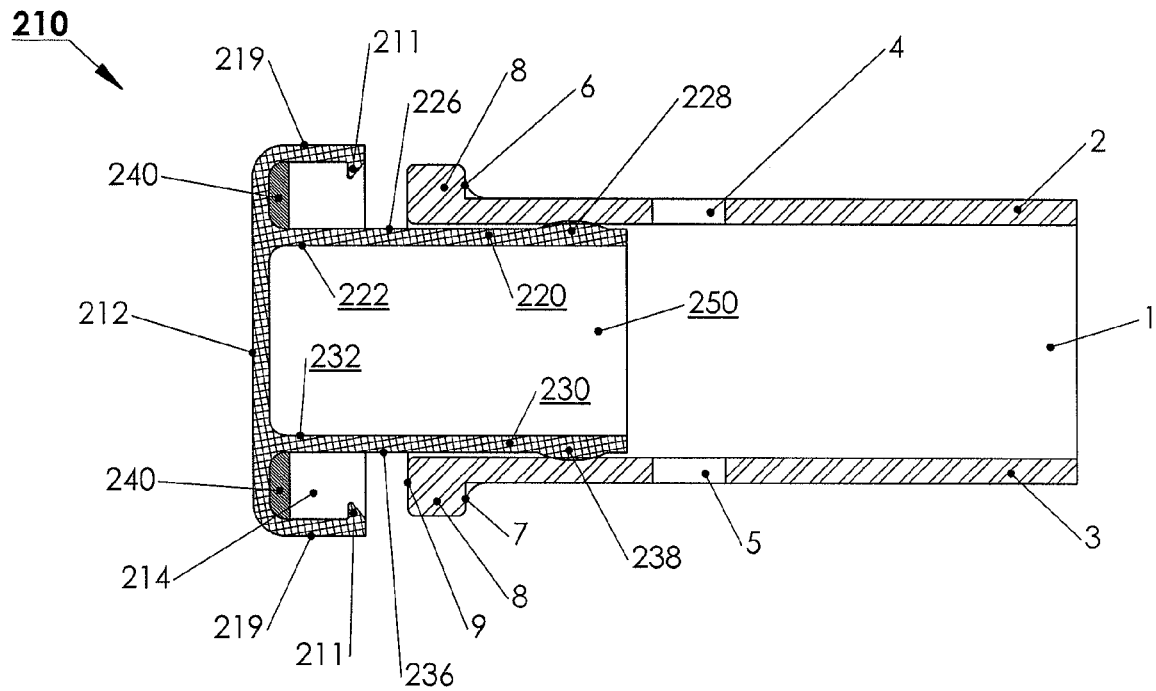
FIG. 11 is a cross-sectioned and top plan view of the cover illustrated in FIGS. 9 and 10 showing the cover prior to engagement with a trailer hitch receiver.
Figure 12:
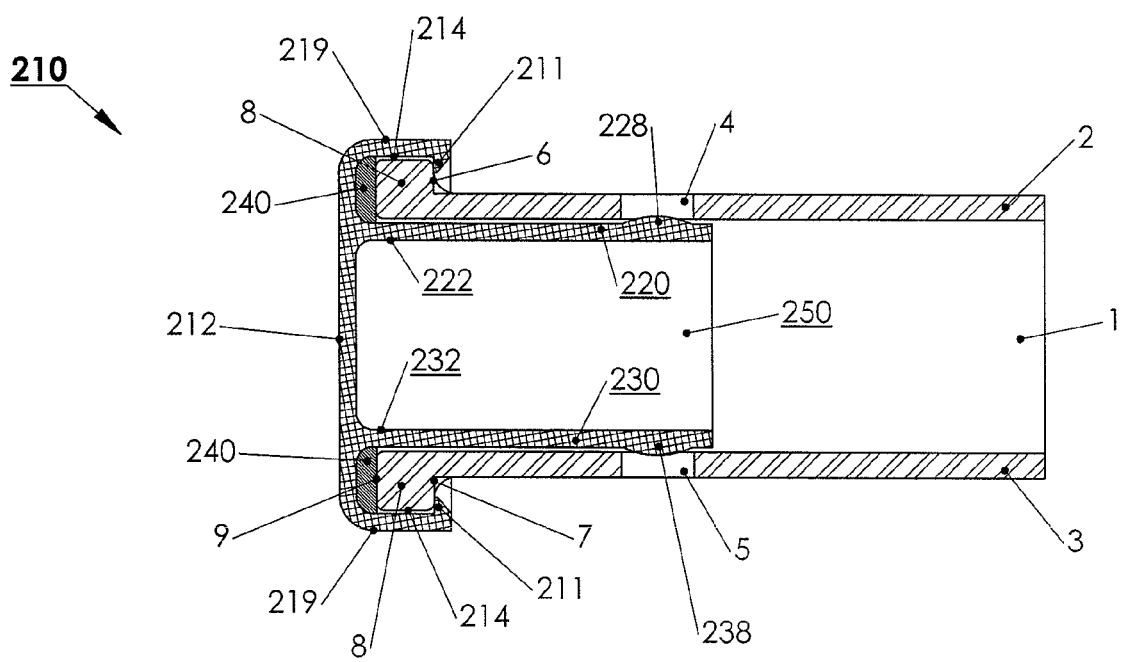
FIG. 12 is a view similar to that illustrated in FIG. 11 but showing the cover fully engaged with the trailer hitch receiver.

As shown in FIG. 11, the cover 210 is urged towards the receiver 1 such that the hollow extension member 250 is introduced into the receiver 1. As the inner capture cavity 214 and the lips 211 are urged towards the flange 8, the cover 210 and the catch tabs 219 will have enough resiliency to allow the lips 211 to pass over the peripheral collar or flange 8. Note also that the lips 211 have a ramped outer surface that facilitates movement over the flange 8. As the lips 211 continue to pass over the flange 8, the front face 9 of the flange will come into contact with a gasket 240 disposed within the capture cavity 214. Ultimately, the lips 211 will snap into place thereby engaging the rearwardly-facing surfaces 6, 7 of the front flange 8. As the capture cavity 214 becomes fully engaged with the hitch receiver flange 8, the tab 228 of the first side wall 220 will seat into the first side wall aperture 4 and the tab 238 of the second side wall 230 will seat into the second side wall aperture 5, thereby preventing the entry of debris, water and other foreign matter into the receiver tube 1 at those apertures 4, 5 as well. As described earlier, this allows the receiver tube 1 from becoming contaminated by dirt and corrosive agents and preserves the integrity of the inside surfaces of the tube 1 under adverse environmental conditions. The fully engaged cover 210 is illustrated in FIG. 12. To remove the cover 210 from the receiver tube 1, the lips 211 must be lifted to disengage them from the flange 8 and then the reverse of the other steps identified can be performed.

Accordingly, it will be seen that there has been provided a new and useful trailer hitch receiver cover that effectively wraps around the peripheral collar or flange of the hitch receiver to prevent the exposure of the hitch receiver interior to the elements. The cover also incorporates means for sealing the lateral holes in the hitch receiver and provides both features in a single unitary device. The cover can be fabricated of a resilient and flexible material.

The principles of this invention having been described in accordance with the foregoing, we claim:

1. A cover for use with a trailer hitch receiver, the trailer hitch receiver having an opening, a flange encircling the receiver at its opening, said flange including a rearward-facing flange surface, and opposing side walls and apertures defined within said side walls, said cover comprising
   a front face with edges, the edges of the front face extending rearwardly of the front face,
   a lip extending inwardly of the front face edges,
   a pair of opposing side members extending rearwardly of the front face, and
   a tab extending from each of the side members to seal the side wall apertures of the receiver,
   wherein the lip captures a portion of the rearward-facing receiver flange surface.

2. A cover for use with a trailer hitch receiver, the receiver being a square-shaped elongate metal tube having a square cross-section and an opening, a first side wall, a second side wall, the first side wall including a first side wall aperture and the second side wall including a second side wall aperture, the side wall apertures being linearly aligned, and a peripheral flange, said flange completely encircling the receiver at its opening and having a rearward-facing flange surface, said cover comprising
   a front face with edges, the edges of the front face extending rearwardly of the front face,
   a lip extending inwardly of the front face edges to capture a portion of the rearward-facing receiver flange surface,
   a pair of opposing side members extending rearwardly of the front face, and
   a tab extending from each of the side members to seal the side wall apertures of the receiver tube.

3. The trailer hitch receiver cover of claim 2 wherein the opposing side members of the cover are disposed to the outside of the receiver and each side member further comprises an inner surface, said tabs extending inwardly towards the receiver from each side member inner surface.

4. The trailer hitch receiver cover of claim 2 wherein the opposing side members of the cover are disposed to the inside of the receiver and each side member further comprises an outer surface, said tabs extending outwardly towards the receiver from each side member outer surface.

5. The trailer hitch receiver cover of claim 2 wherein the side members are disposed to the inside of the side walls of the receiver and form a substantially continuous inwardly-extending member.

6. The trailer hitch receiver cover of claim 5 wherein the cover further comprises a bottom edge at the front face and a pull tab disposed immediately below the bottom edge of the front face, the pull tab being used to aid in the removal of the cover from the receiver flange.

7. The trailer hitch receiver cover of claim 2 wherein the cover further comprises an inner capture cavity recess defined between said front face and said inwardly extending lip, the capture cavity recess engaging the receiver flange such that debris, water or other foreign matter is prevented from entering the receiver.

8. The trailer hitch receiver cover of claim 7 wherein the cover further comprises a resilient gasket that is disposed within the inner capture cavity recess.

9. The trailer hitch receiver cover of claim 2 wherein the cover is constructed of a single piece of material, said material being a resilient and weather-resistant rubber material.

10. The trailer hitch receiver cover of claim 9 wherein the cover is made of a material that is fabricated in any color that is available for molding of rubber material.

* * * * *